US012649425B2

(12) United States Patent
Shirakawa et al.

(10) Patent No.: US 12,649,425 B2
(45) Date of Patent: Jun. 9, 2026

(54) REAR GATE FOR VEHICLE

(71) Applicant: SUBARU CORPORATION, Tokyo (JP)

(72) Inventors: Kouhei Shirakawa, Tokyo (JP); Kenichirou Takahashi, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 18/793,336

(22) Filed: Aug. 2, 2024

(65) Prior Publication Data

US 2025/0083619 A1     Mar. 13, 2025

(51) Int. Cl.
B60R 13/10          (2006.01)
B60J 5/10           (2006.01)

(52) U.S. Cl.
CPC ............. B60R 13/105 (2013.01); B60J 5/107 (2013.01)

(58) Field of Classification Search
CPC .......... B60J 5/107; B60J 5/101; B60R 13/105
See application file for complete search history.

(56) References Cited

U.S. PATENT DOCUMENTS

| | | | | |
|---|---|---|---|---|
| 8,220,855 B2 * | 7/2012 | Nakamura | ............... | B60J 5/107 |
| | | | | 296/146.7 |
| 10,479,415 B2 * | 11/2019 | Adachi | ................... | B60J 5/101 |
| 11,850,926 B2 * | 12/2023 | Leterrier | .................. | B60J 5/107 |
| 2003/0071481 A1 * | 4/2003 | Igarashi | ................... | B60J 5/101 |
| | | | | 296/76 |
| 2015/0075043 A1 * | 3/2015 | Marko, Jr. | ............ | B60R 13/105 |
| | | | | 29/525.01 |
| 2015/0291016 A1 * | 10/2015 | Kato | ........................ | B60J 5/101 |
| | | | | 49/501 |
| 2016/0114663 A1 * | 4/2016 | Kawashima | ............. | B60J 5/107 |
| | | | | 49/501 |

FOREIGN PATENT DOCUMENTS

| | | |
|---|---|---|
| JP | 2014-101060 A | 6/2014 |
| JP | 2017-218099 A | 12/2017 |
| JP | 2018-197081 A | 12/2018 |

* cited by examiner

*Primary Examiner* — Marcus Menezes

(74) *Attorney, Agent, or Firm* — McGinn IP Law Group, PLLC

(57)                    ABSTRACT

A rear gate for a vehicle includes an inner panel and an outer panel superimposed on the inner panel. The rear gate is provided so as to be openable and closable with respect to a rear opening of the vehicle. The rear gate includes an attachment surface, supports, and first and second beads. The attachment surface is provided in the outer panel and allows attachment of a display member of the vehicle. The supports are provided on at least left and right sides in the attachment surface and allow the display member to be supported on the attachment surface. The first bead is provided between the supports on the left and right sides. The second bead extends at least from the support on the left side to the support on the right side. The first and second beads are formed by deforming the attachment surface of the outer panel.

17 Claims, 7 Drawing Sheets

REAR GATE FOR VEHICLE

CROSS-REFERENCE TO RELATED APPLICATIONS

The present application claims priority from Japanese Patent Application No. 2023-148456 filed on Sep. 13, 2023, the entire contents of which are hereby incorporated by reference.

BACKGROUND

The disclosure relates to a rear gate for a vehicle.

Some vehicles such as automobiles include a rear gate. The rear gate is provided to be openable and closable with respect to a rear opening of a vehicle (Japanese Unexamined Patent Application Publication (JP-A) Nos. 2014-101060, 2018-197081, and 2017-218099).

Additionally, the rear gate of the vehicle may include an attachment surface allowing attachment of a display member such as a license plate of the vehicle. The attachment surface is basically to be formed in a planar shape in accordance with laws and regulations of various countries.

SUMMARY

An aspect of the disclosure provides a rear gate for a vehicle. The rear gate includes an inner panel and an outer panel superimposed on the inner panel. The rear gate is provided so as to be openable and closable with respect to a rear opening of the vehicle. The rear gate includes an attachment surface, supports, a first bead, and a second bead. The attachment surface is provided in the outer panel. The attachment surface allows attachment of a display member of the vehicle. The supports are provided on at least left and right sides in the attachment surface. The supports allow the display member to be supported on the attachment surface. The first bead is provided between the supports on the left and right sides. The first bead is formed by deforming the attachment surface of the outer panel. The second bead extends at least over a width from one of the supports on the left side to one of the supports on the right side. The second bead is formed by deforming the attachment surface of the outer panel.

BRIEF DESCRIPTION OF THE DRAWINGS

The accompanying drawings are included to provide a further understanding of the disclosure and are incorporated in and constitute a part of this specification. The drawings illustrate embodiments and, together with the specification, serve to describe the principles of the disclosure.

DETAILED DESCRIPTION

Figure 1:
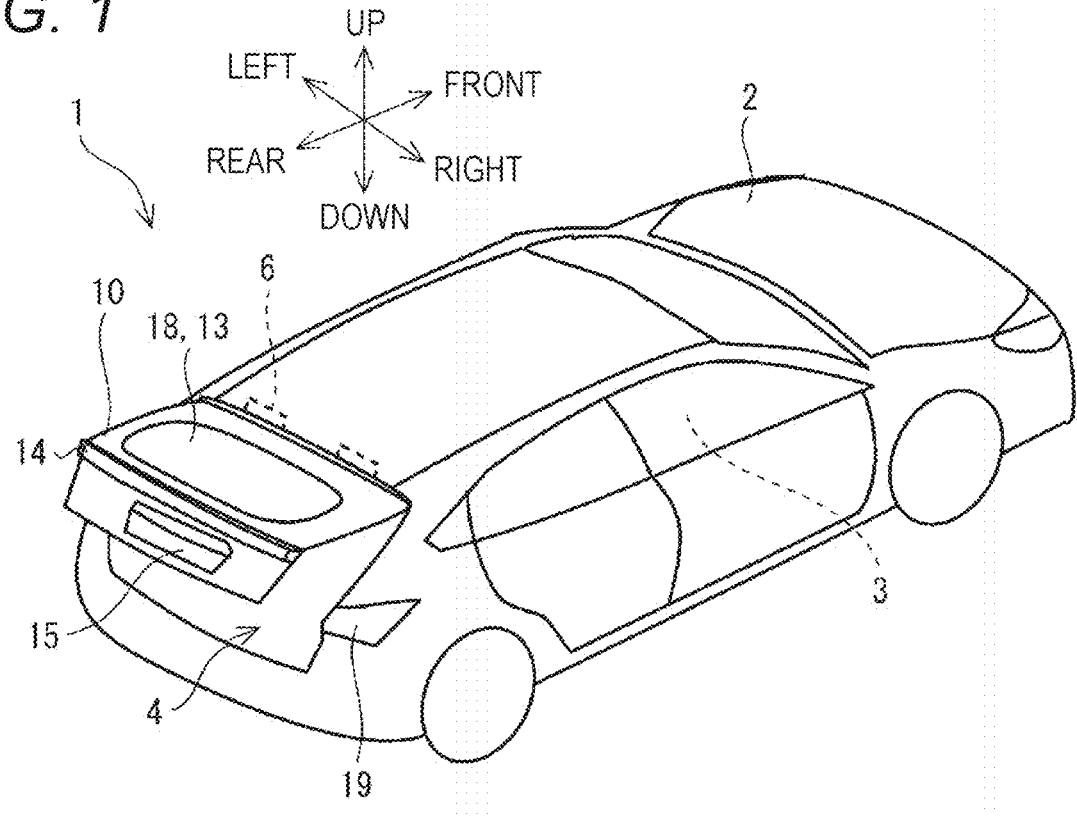
FIG. 1 is a perspective view of an automobile including a rear gate according to an embodiment of the disclosure.

The attachment surface and the display member may vibrate, for example, because of idling of the vehicle. The attachment surface is to be formed in a planar shape. The display member is, for example, a license plate to be attached to the attachment surface and having a flat plate shape. Additionally, the vibrations of the attachment surface and the display member may be amplified at the rear gate including an inner panel and an outer panel superimposed on the inner panel and may be transmitted to the inside of the vehicle. The sound transmitted to the inside of the vehicle may be heard by an occupant of the vehicle as noise. For example, the vibrations of the attachment surface having the planar shape cause a so-called muffled noise, which may be heard by the occupant. Additionally, the vibrations of the license plate having the flat plate shape cause a so-called rattling noise, which may be heard by the occupant.

With this being the situation, JP-A Nos. 2014-101060, 2018-197081, and 2017-218099 propose that a part of the inner panel constituting the rear gate is extended to and coupled to the outer panel, and that a reinforcement is interposed between the inner panel and the outer panel. According to the proposals, it can be expected to reduce, for example, the vibrations of the attachment surface formed in the outer panel of the rear gate and having the planar shape.

However, to extend the part of the inner panel constituting the rear gate to the outer panel, a special process is to be applied to the inner panel. Additionally, to interpose the reinforcement between the inner panel and the outer panel, a process for interposing the reinforcement between the inner panel and the outer panel is to be performed. Furthermore, any of the proposals results in the complication of the structure of the rear gate of the vehicle.

Thus, for the rear gate of the vehicle, it is desirable to reduce the generation of the noise from the rear gate by reducing the vibrations of the attachment surface and the display member attached to the attachment surface while avoiding the complication of the structure of the rear gate of the vehicle.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

FIG. 1 is a perspective view of an automobile 1 including a rear gate 10 according to the embodiment of the disclosure. In FIG. 1, the rear gate 10 is open.

Figure 2:
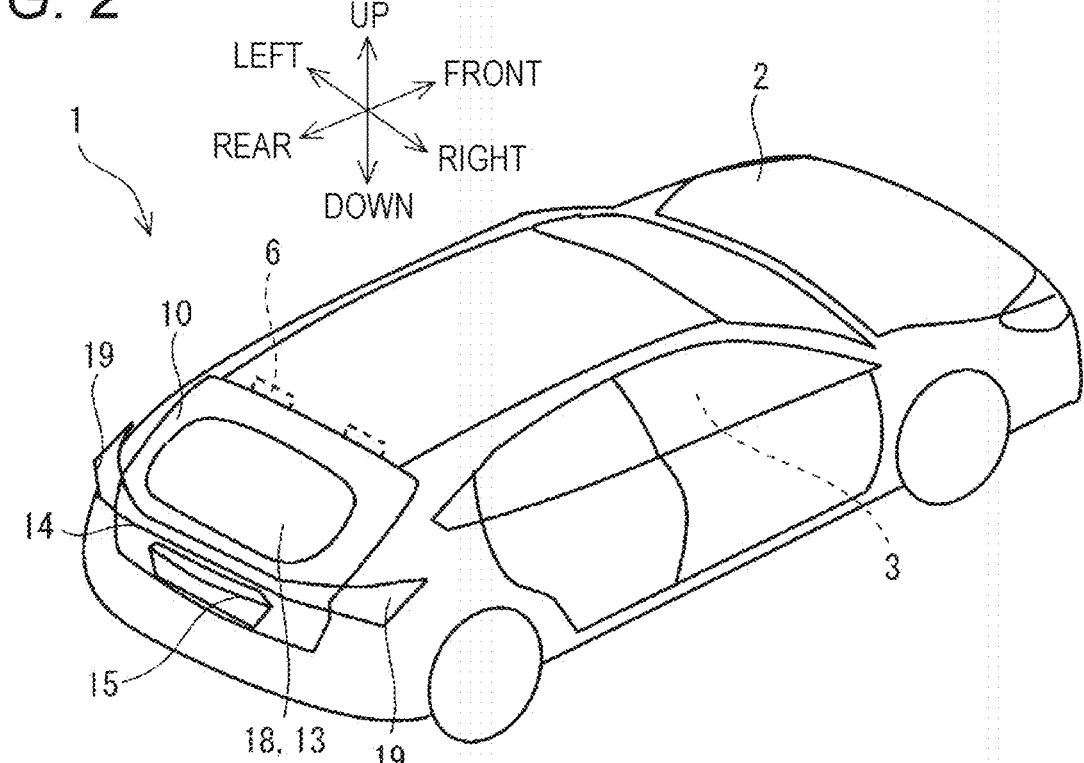
FIG. 2 is a view of the automobile in FIG. 1 with the rear gate being closed.

FIG. 2 is a view of the automobile 1 in FIG. 1 with the rear gate 10 being closed.

The automobile 1 in FIG. 1 is an example of a vehicle. The automobile 1 includes a vehicle body 2 in which a vehicle interior 3 is defined. The vehicle body 2 of the automobile 1 includes a plurality of doors for allowing an occupant to get into and out the vehicle interior 3 therethrough, and the rear gate 10 for allowing the occupant to access to a rear luggage compartment in the vehicle interior 3 therethrough. The rear gate 10 is hinged, at its upper edge part, to a roof part of the vehicle body 2 by hinge members 6.

When the rear gate 10 is moved to an open position, as illustrated in FIG. 1, a rear opening 4 appears in the vehicle body 2 of the automobile 1. The occupant can put and take luggage in and out of the luggage compartment through the rear opening 4. Additionally, the occupant pulls downward the rear gate 10 in the open position. Accordingly, the rear gate 10 is closed as illustrated in FIG. 2. The rear opening 4 of the vehicle body 2 of the automobile 1 is closed. The luggage in the luggage compartment does not fall off through the rear opening 4.

As described above, the rear gate 10 is provided to be openable and closable with respect to the rear opening 4 of the automobile 1.

Figure 3:
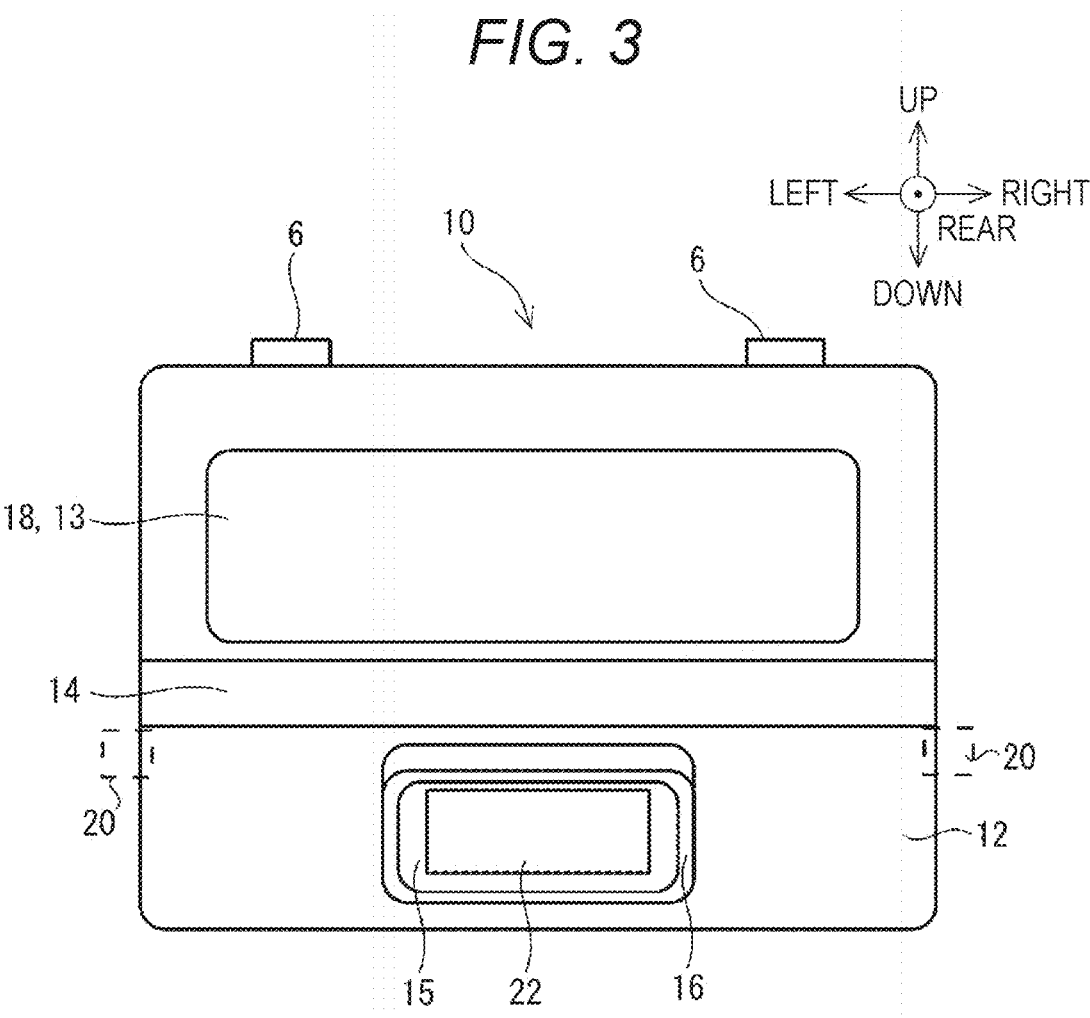
FIG. 3 schematically illustrates a flat development of the rear gate in FIG. 1.

FIG. 3 schematically illustrates a flat development of the rear gate 10 in FIG. 1. The rear gate 10 illustrated schematically in FIG. 3 is viewed from the rear of the automobile 1 in FIG. 1.

Figure 4:
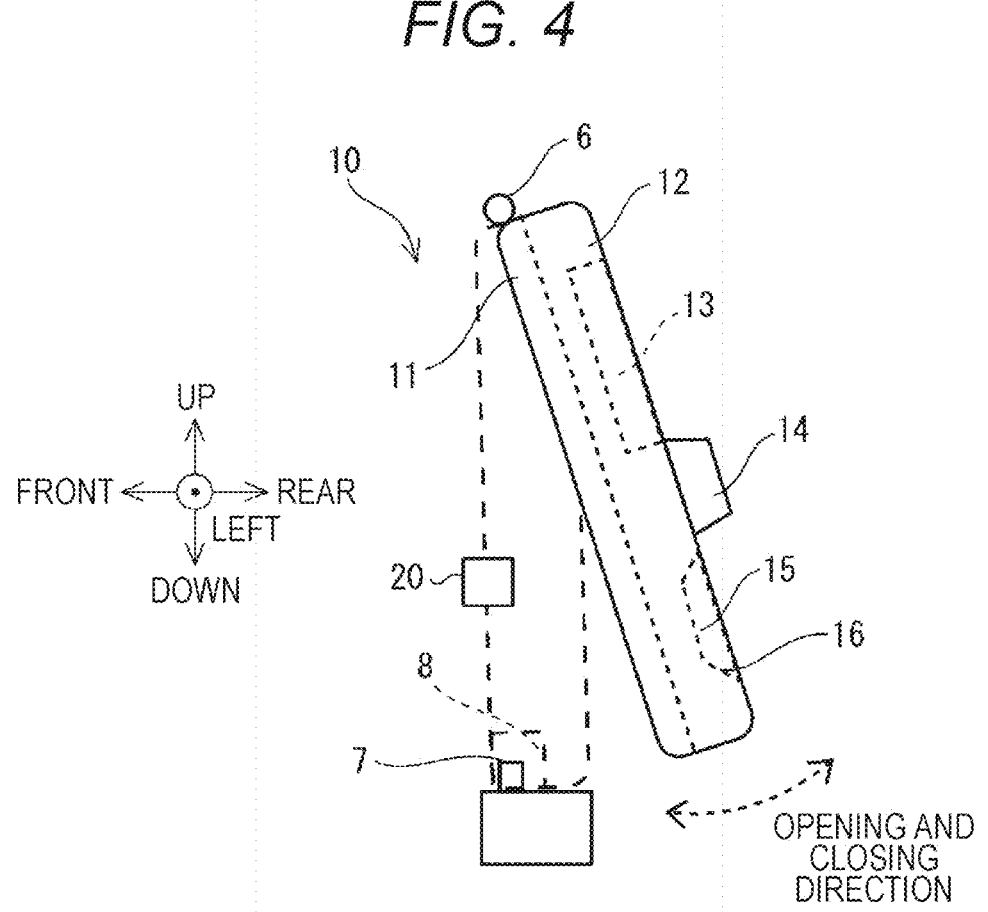
FIG. 4 is a side view of the rear gate illustrated schematically in FIG. 3, illustrating an opening and closing operation of the rear gate.

FIG. 4 is a side view of the rear gate 10 illustrated schematically in FIG. 3, illustrating an opening and closing operation of the rear gate 10;

In FIG. 3 and subsequent drawings, front, rear, left, right, up, and down directions indicate directions in the state where the rear gate 10 is closed as illustrated in FIG. 2.

As illustrated in FIGS. 3 and 4, the rear gate 10 includes an inner panel 11 and an outer panel 12 superimposed on an outer side of the inner panel 11.

The inner panel 11 and the outer panel 12 are formed by forming a steel plate having a substantially rectangular outer shape as illustrated in FIGS. 3 and 4 into an outer shape in conformance with the rear opening 4 so as to be able to close the rear opening 4 of the automobile 1. For example, the outer panel 12 is exposed to an outer surface of the automobile 1 and constitutes the design of the automobile 1. The inner panel 11 and the outer panel 12 are typically formed into a desired extruded shape by press working. The inner panel 11 and the outer panel 12 may be superimposed on each other at their outer peripheral edges and bonded together with an adhesive. The outer peripheral edge of the outer panel 12 may be bent outside the outer peripheral edge of the inner panel 11, and the outer peripheral edge of the inner panel 11 may be gripped by the bent part. The inner panel 11 and the outer panel 12 superimposed on each other with such a structure can have basic rigidity intended for the rear gate 10. The hinge members 6 may be basically attached to the upper edge of the inner panel 11 made of the steel plate having the substantially rectangular outer shape. Consequently, the hinge members 6 can be covered with the outer panel 12 as illustrated in FIG. 2 in the state where the rear gate 10 is closed.

The rear gate 10 has an opening 13 at an upper part thereof. The opening 13 is allowed to penetrate through upper parts of the inner panel 11 and the outer panel 12 that are formed by forming the steel plate having the substantially rectangular outer shape into an extruded shape. The opening 13 at the upper part of the rear gate 10 is fitted with a rear glass 18 from, for example, outside of the outer panel 12. Note that, the inner panel 11 and the outer panel 12 may also be superimposed on each other around the opening 13 and bonded together with an adhesive. Additionally, an opening edge of the outer panel 12 may be bent inside an opening edge of the inner panel 11, and the opening edge of the inner panel 11 may be gripped by the bent part. With such a structure, the inner panel 11 and the outer panel 12 can have a minimum rigidity enough to maintain the shapes of the upper parts thereof, even if a large opening 13 is formed in the upper parts of the inner panel 11 and the outer panel 12.

The outer panel 12 of the rear gate 10 has an attachment surface 15 at a lower part thereof. The attachment surface 15 allows attachment of a license plate 22 having a substantially rectangular flat plate shape. In some embodiments, as will be described later, the attachment surface 15 is formed in a planar shape larger in size than a plurality of types of license plates 22 and 23 such that the license plates 22 and 23 employed in a plurality of countries in which the automobile 1 is to be registered can be attached. Additionally, in accordance with the laws and regulations of various countries, the attachment surface 15 allowing the attachment of the license plate is basically to be formed in a planar shape in order to, for example, ensure the visibility of the license plate. Note that, in some specific countries, there is a country in which a license plate having a light emission function is permitted by the laws and regulations. Additionally, in the future, any possible attachment to the attachment surface 15 includes a display member capable of displaying an automatic driving state and a traveling state such as a speed by changing a lighting state.

The attachment surface 15 may be formed in the outer panel 12 by, for example, extruding the outer panel 12 by press working. The attachment surface 15 according to the present embodiment has, around its periphery, a frame 16 extruded into a curved shape by press working. The attachment surface 15 is formed in the outer panel 12 in a state of being recessed forward of the automobile 1 with respect to the remaining part of the outer panel 12 other than the attachment surface 15. The attachment surface 15 can serve to stiffen the outer panel 12 since the attachment surface 15 has, around its periphery, the frame 16 formed into the curved shape. With the attachment surface 15 as described above being formed, it can be expected that the outer panel 12 is less likely to vibrate as a whole.

The outer panel 12 of the rear gate 10 includes a transverse cover member 14 at an up-down directional central part thereof between the opening 13 for the rear glass 18 and the attachment surface 15. The transverse cover member 14 has a laterally long shape extending across the full left-right directional width of the outer panel 12 at the up-down directional central part of the outer panel 12. As illustrated in FIG. 2, the transverse cover member 14 having the laterally long shape is provided so as to extend between left and right rear lamp members 19. The transverse cover member 14 provides an integrated design with the left and right rear lamp members 19. Note that, the transverse cover member 14 may include, for example, a lighting member (not illustrated) that can turn on in conjunction with the left and right rear lamp members 19, and a lighting member (not illustrated) for illuminating the license plate 22 to be attached to the attachment surface 15.

The rear gate 10 includes a latch member 8 in a lower-edge central part thereof. The latch member 8 is engageable with a latch receiving member 7 provided in the vehicle body 2. Additionally, the vehicle body 2 includes left and right elastic members 20 provided to be in contact with a left edge part and a right edge part of the rear gate 10.

Consequently, the rear gate 10 that rotates about the hinge members 6 can be in a closed position with respect to the vehicle body 2 in a state where the latch member 8 is engaged with the latch receiving member 7 and the left edge part and the right edge part of the rear gate 10 are in contact with the left and right elastic members 20. The rear gate 10 in the closed position is less likely to rattle with respect to the vehicle body 2 or to vibrate with respect to the vehicle body 2. It can be expected that noise due to the vibrations of the whole of the rear gate 10 is less likely to be generated.

Next, a typical attachment surface 15 conforming to the laws and regulations for the license plate 22 will be described.

Figures 5, 6:
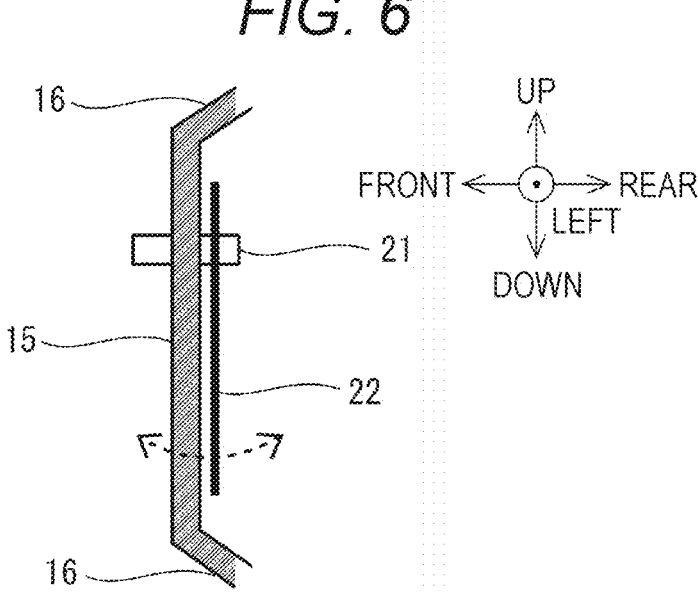
FIG. 5 is a longitudinal sectional view of a typical attachment surface formed in an outer panel of the rear gate and having a planar shape.
FIG. 6 is a longitudinal sectional view of the typical attachment surface having the planar shape in FIG. 5, with a license plate that is a display member and has a flat plate shape being attached.

FIG. 5 is a longitudinal sectional view of the typical attachment surface 15 formed in the outer panel 12 of the rear gate 10 and having a planar shape.

FIG. 6 is a longitudinal sectional view of the typical attachment surface 15 having the planar shape in FIG. 5, with the license plate 22 that is the display member and has a flat plate shape being attached.

As illustrated in FIGS. 5 and 6, the attachment surface 15 conforming to the laws and regulations is formed in the planar shape. The attachment surface 15 having the planar shape has, around its periphery, the frame 16 extruded into the curved shape by press working.

In the case where the attachment surface 15 is formed in the planar shape as described above, as illustrated in FIG. 5, the attachment surface 15 having the planar shape may vibrate as a whole. For example, in cases where the automobile 1 is idling, where the automobile 1 is traveling, where the rear gate 10 in the open position is moved to the closed position, and the like, the attachment surface 15 having the planar shape may vibrate. The vibrations of the attachment surface 15 having the planar shape may be amplified at the rear gate 10 including the inner panel 11 and the outer panel 12 superimposed on the inner panel 11 and may be transmitted to the vehicle interior 3 of the automobile 1. The sound transmitted to the vehicle interior 3 may be heard by the occupant of the automobile 1 as noise. The occupant may hear a so-called muffled noise from the rear gate 10.

Note that, the attachment surface 15 is basically surrounded by the frame 16 so as to have a substantially rectangular planar shape. In this case, it is considered that the attachment surface 15 having the planar shape easily resonates at, for example, a natural frequency corresponding to a diagonal length of a substantially rectangular shape, a natural frequency corresponding to a length from an upper edge to a lower edge of the substantially rectangular shape as illustrated in FIG. 5, and a natural frequency corresponding to a length from a right edge to a left edge of the substantially rectangular shape. It is considered that when vibrations at any natural frequency are transmitted to the attachment surface 15 having the planar shape, the attachment surface 15 resonates and vibrates along an axis in each direction described above, making the attachment surface 15 easy to vibrate greatly as a whole.

As one of measures against such situations, for example, it is conceivable that a part of the inner panel 11 constituting the rear gate 10 is extended to and coupled to the outer panel 12. With this measure, it can be expected to reduce the vibrations of the attachment surface 15 formed in the outer panel 12 of the rear gate 10 and having the substantially planar shape. However, to implement such a measure, an additional special process is to be applied to the inner panel 11 and the like.

Additionally, as another measure, for example, it is conceivable to interpose a reinforcement between the inner panel 11 and the outer panel 12. With this measure, it can be expected to reduce the vibrations of the attachment surface 15 formed in the outer panel 12 of the rear gate 10 and having the substantially planar shape. However, to implement such a measure, a process for interposing the reinforcement between the inner panel 11 and the outer panel 12 is to be performed.

Furthermore, any of the measures results in the complication of the structure of the rear gate 10 of the automobile 1. Additionally, any of the measures may result in an increase in weight of the rear gate 10.

Additionally, when the license plate 22 having the flat plate shape is attached to the attachment surface 15 having the planar shape, as illustrated in FIG. 6, the license plate 22 having the flat plate shape may vibrate. For example, in the cases where the automobile 1 is idling, where the automobile 1 is traveling, where the rear gate 10 in the open position is moved to the closed position, and the like, the license plate 22 having the flat plate shape may vibrate. The vibrations of the license plate 22 having the flat plate shape may be amplified at the rear gate 10 including the inner panel 11 and the outer panel 12 superimposed on the inner panel 11 and may be transmitted to the vehicle interior 3 of the automobile 1. The sound transmitted to the vehicle interior 3 may be heard by the occupant of the automobile 1 as noise. The occupant may hear a so-called rattling noise from the rear gate 10.

Also in this case, with the above two kinds of measures being taken, it can be expected to reduce the rattling noise heard by the occupant.

However, even the above two types of measures cannot reduce the generation of vibrations of the license plate 22 having the flat plate shape itself.

Additionally, any of the above two types of measures results in the complication of the structure of the rear gate 10 of the automobile 1 and may result in an increase in weight of the rear gate 10.

Thus, for the rear gate 10 of the automobile 1, it is desirable to reduce the generation of the noise from the rear gate 10 by reducing the vibrations of the attachment surface 15 and the display member, such as the license plate 22, attached to the attachment surface 15 while avoiding the complication of the structure of the rear gate 10 of the automobile 1.

Figures 7, 8:
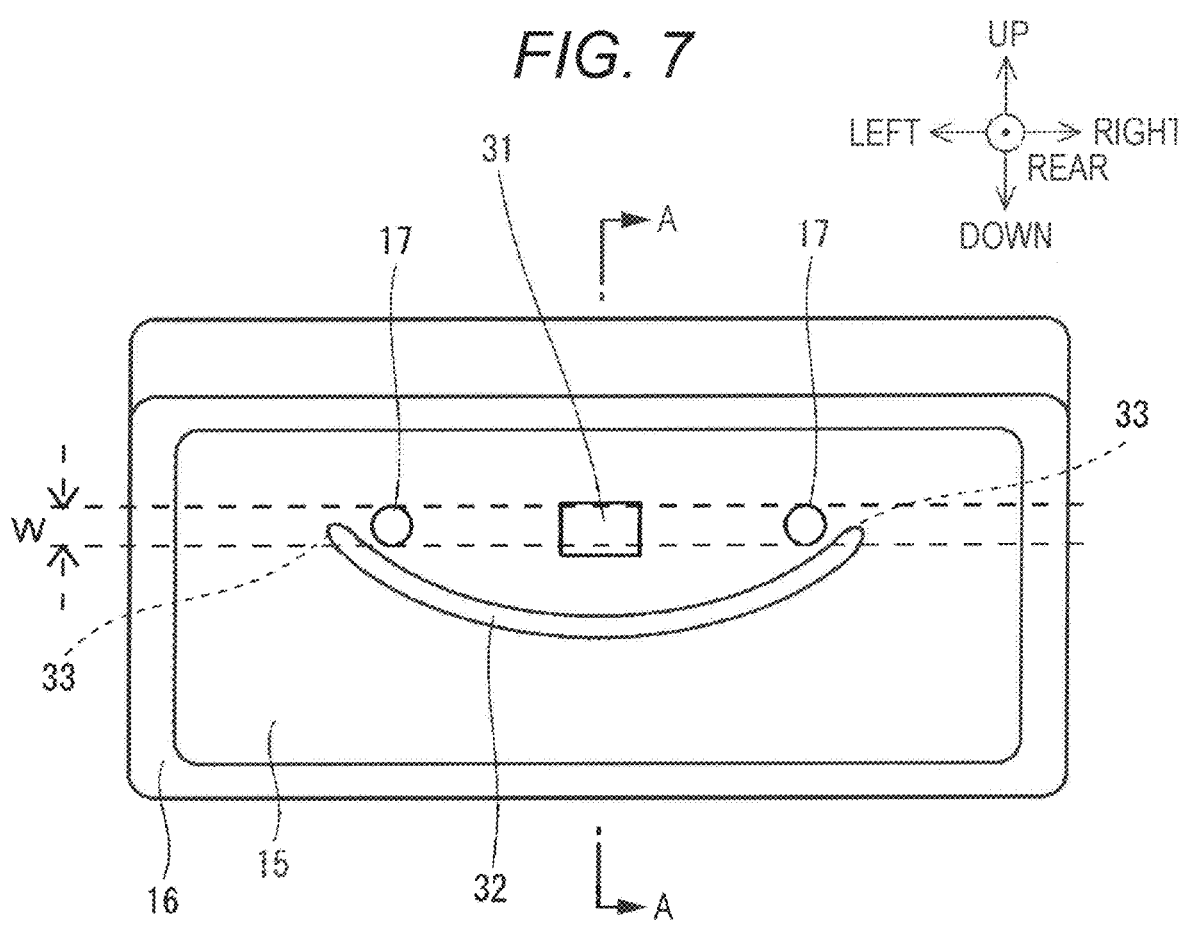
FIG. 7 illustrates the attachment surface according to the present embodiment.
FIG. 8 is a schematic A-A longitudinal sectional view of the attachment surface in FIG. 7.

FIG. 7 illustrates the attachment surface 15 according to the present embodiment. The attachment surface 15 in FIG. 7 is viewed from the rear of the automobile 1 in FIG. 1.

FIG. 8 is a schematic A-A longitudinal sectional view of the attachment surface 15 in FIG. 7. The A-A longitudinal section in FIG. 7 is a longitudinal section of the attachment surface 15 at the left-right directional center.

As illustrated in FIGS. 7 and 8, the attachment surface 15 according to the present embodiment is basically formed in a planar shape in the outer panel 12. The attachment surface 15 having the planar shape has, around its periphery, the frame 16 extruded into the curved shape by press working.

Additionally, the attachment surface 15 includes a first bead 31 and a second bead 32 together with support holes 17.

The support holes 17 are provided in the attachment surface 15 formed in the outer panel 12 and having the planar shape in order to attach the license plate 22 having the flat plate shape to the outer surface of the attachment surface 15 formed in the lower part of the outer panel 12. The support holes 17 are fastened together with holes of the license plate 22 having the flat plate shape by using fastening members 21 such as screws. Thus, the license plate 22 having the flat plate shape is attached so as to be supported by the outer surface of the attachment surface 15.

In some embodiments, the support holes 17 are formed on at least left and right sides in the attachment surface 15. Such support holes 17 may also be referred to as left and right support holes 17. The left and right support holes 17 are formed in the attachment surface 15 such that the left and right support holes 17 are aligned in the left-right direction of the automobile 1. The support holes 17 may be provided in the attachment surface 15 such that a plurality of pairs of support holes 17, each pair having left and right support holes, are aligned in the up-down direction. In some embodiments, the support holes 17 may be provided in the attachment surface 15 in accordance with the country in which the automobile 1 is used.

Note that, instead of the license plate 22 having the flat plate shape, even when another display member is attached to the outer surface of the attachment surface 15, the support holes 17 may be fastened together with the holes of the display member by using the fastening member 21.

Additionally, the attachment surface 15 may have support projections instead of the support holes 17. In this case, the license plate 22 having the flat plate shape can be attached so as to be supported by the outer surface of the attachment surface 15 by inserting each of the support projections into a corresponding one of the holes of the license plate 22.

The first bead 31 is formed between the left and right support holes 17 in the attachment surface 15 formed in the lower part of the outer panel 12. In FIG. 7, the first bead 31 is formed in a substantially rectangular shape at a center position between the left and right support holes 17.

The first bead 31 may be formed in the attachment surface 15 by extruding and deforming the attachment surface 15 of the outer panel 12, for example, when the outer panel 12 is extruded by press working or the like.

As illustrated in FIG. 7, the first bead 31 having the substantially rectangular shape may be formed such that the up-down directional width thereof is equal to the up-down directional width W of each support hole 17.

As illustrated in FIG. 8, the first bead 31 is formed in the attachment surface 15 so as to protrude rearward from the attachment surface 15. Consequently, the first bead 31 is formed so as to protrude from the outer surface of the attachment surface 15 between the left and right support holes 17.

The second bead 32 is formed in an arc shape so as not to have a corner in the attachment surface 15 formed at the lower part of the outer panel 12.

The second bead 32 may be formed in the attachment surface 15 by extruding and deforming the attachment surface 15 of the outer panel 12 when the outer panel 12 is extruded by press working or the like.

As illustrated in FIG. 7, the second bead 32 having the arc shape is formed in the attachment surface 15 so as to be in a position below the left and right support holes 17. The second bead 32 having the arc shape is formed in the attachment surface 15 such that the second bead 32 is adjacent to the left and right support holes 17 in the up-down direction of the automobile 1.

The second bead 32 having the arc shape is formed in the attachment surface 15 such that the arc shape has a lower-most end at its central part and two ends 33 extending upward. The two ends 33 of the arc shape of the second bead 32 are higher in position than the central part of the arc shape.

The two ends 33 of the arc shape of the second bead 32 formed so as to be adjacent to the lower sides of the left and right support holes 17 extend to height positions where the left and right support holes 17 are formed. The second bead 32 having the arc shape is formed to extend such that the two ends 33 of the arc shape lie within a range of the up-down directional width W of the left and right support holes 17. Note that, the two ends 33 of the arc shape may extend to be higher in position than the left and right support holes 17.

As a result, the two ends 33 of the arc shape are respectively positioned on left and right outer sides of the left and right support holes 17 in the attachment surface 15.

Additionally, the second bead 32 having the arc shape is formed so as to extend at least over the left-right directional width from the support hole 17 on the left side to the support hole 17 on the right side.

As illustrated in FIG. 8, the second bead 32 is formed in the attachment surface 15 so as to protrude forward from the attachment surface 15. Consequently, the second bead 32 is formed so as not to protrude from the outer surface of the attachment surface 15.

Then, with the second bead 32 having such an arc shape being formed, the attachment surface 15 having the planar shape has higher rigidity, and the attachment surface 15 is less likely to vibrate as a whole.

For example, the second bead 32 according to the present embodiment has the arc shape without a corner. Consequently, the attachment surface 15 having the planar shape is less likely to vibrate as a whole along a diagonal axis of, a left-right directional axis of, and an up-down directional axis of the substantially rectangular shape thereof.

On the other hand, for example, if the second bead 32 has a left-right directional straight line shape, the second bead 32 is difficult to reduce the vibrations of the whole of the attachment surface 15 having the planar shape along the up-down directional axis.

In addition to this, for example, if the second bead 32 has an up-down directional straight line shape, the second bead 32 is difficult to reduce the vibrations of the whole of the attachment surface 15 having the planar shape along the left-right directional axis.

In addition to this, for example, if the second bead 32 has a V shape, the second bead 32 may reduce the vibrations of the whole of the attachment surface 15 having the planar shape but may easily resonate at a natural frequency corresponding to a distance between a lower corner part of the V shape and a peripheral edge part of the attachment surface 15. In this case, the attachment surface 15 having the planar shape may easily vibrate at a frequency different from the frequencies described above.

Figure 9:
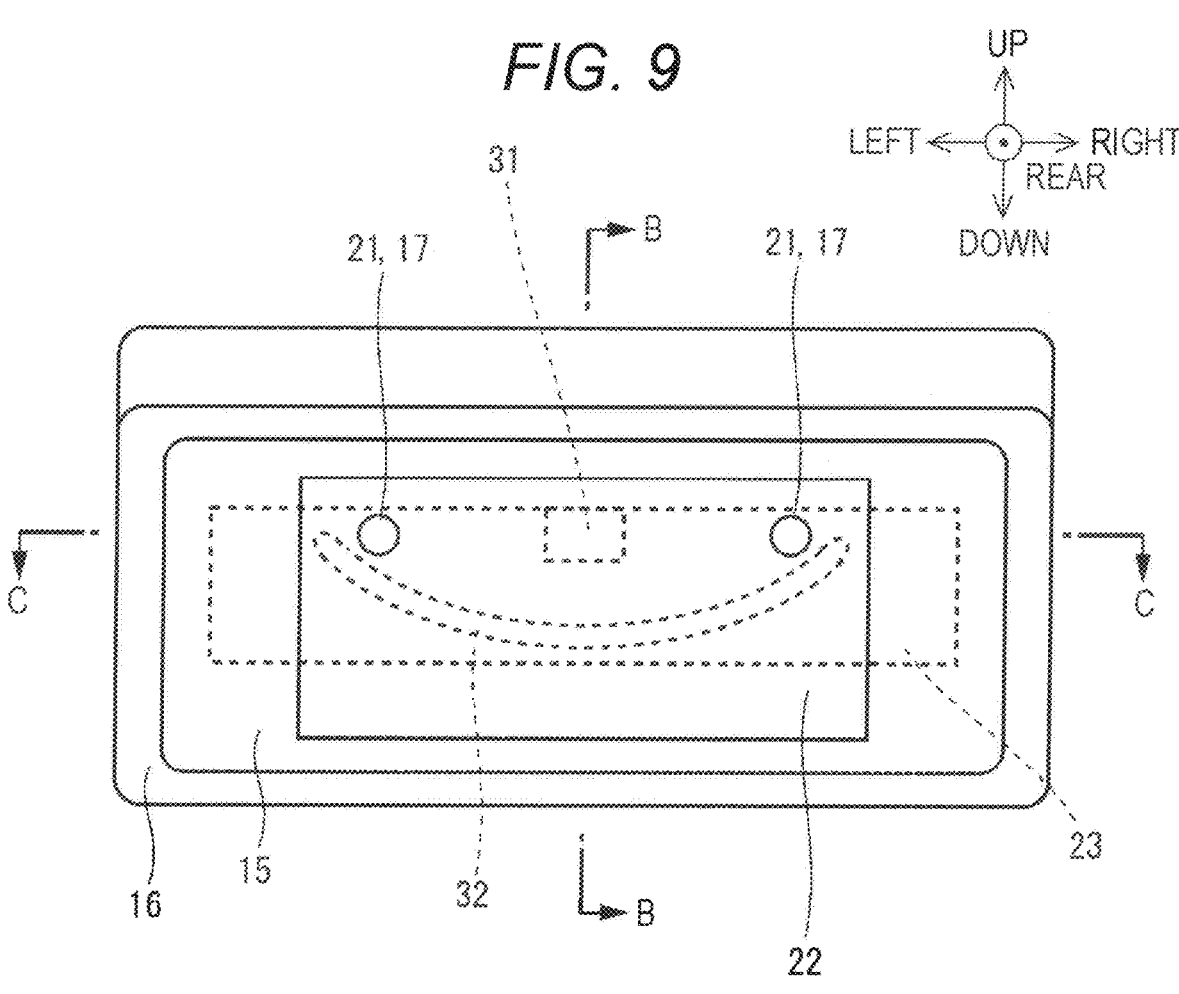
FIG. 9 illustrates the attachment surface in FIG. 7, with the license plate that is the display member and has the flat plate shape being attached.

FIG. 9 illustrates the attachment surface 15 in FIG. 7, with the license plate 22 that is the display member and has the flat plate shape being attached.

Figure 10:
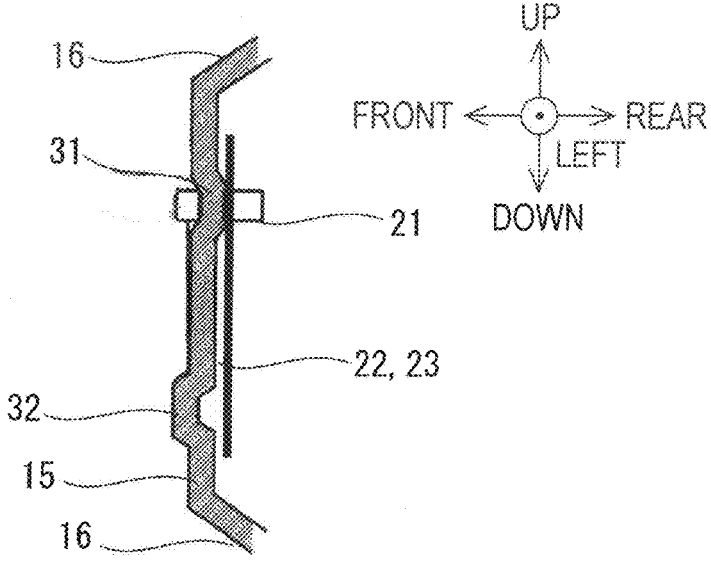
FIG. 10 is an exemplary schematic B-B longitudinal sectional view of the attachment surface and the license plate that has the flat plate shape, which are illustrated in FIG. 9.

FIG. 10 is an exemplary schematic B-B longitudinal sectional view of the attachment surface 15 and the license plate 22 that has the flat plate shape, which are illustrated in FIG. 9. The B-B longitudinal section of FIG. 9 is a longitudinal section of the attachment surface 15 at the left-right directional center.

Figures 11, 12:
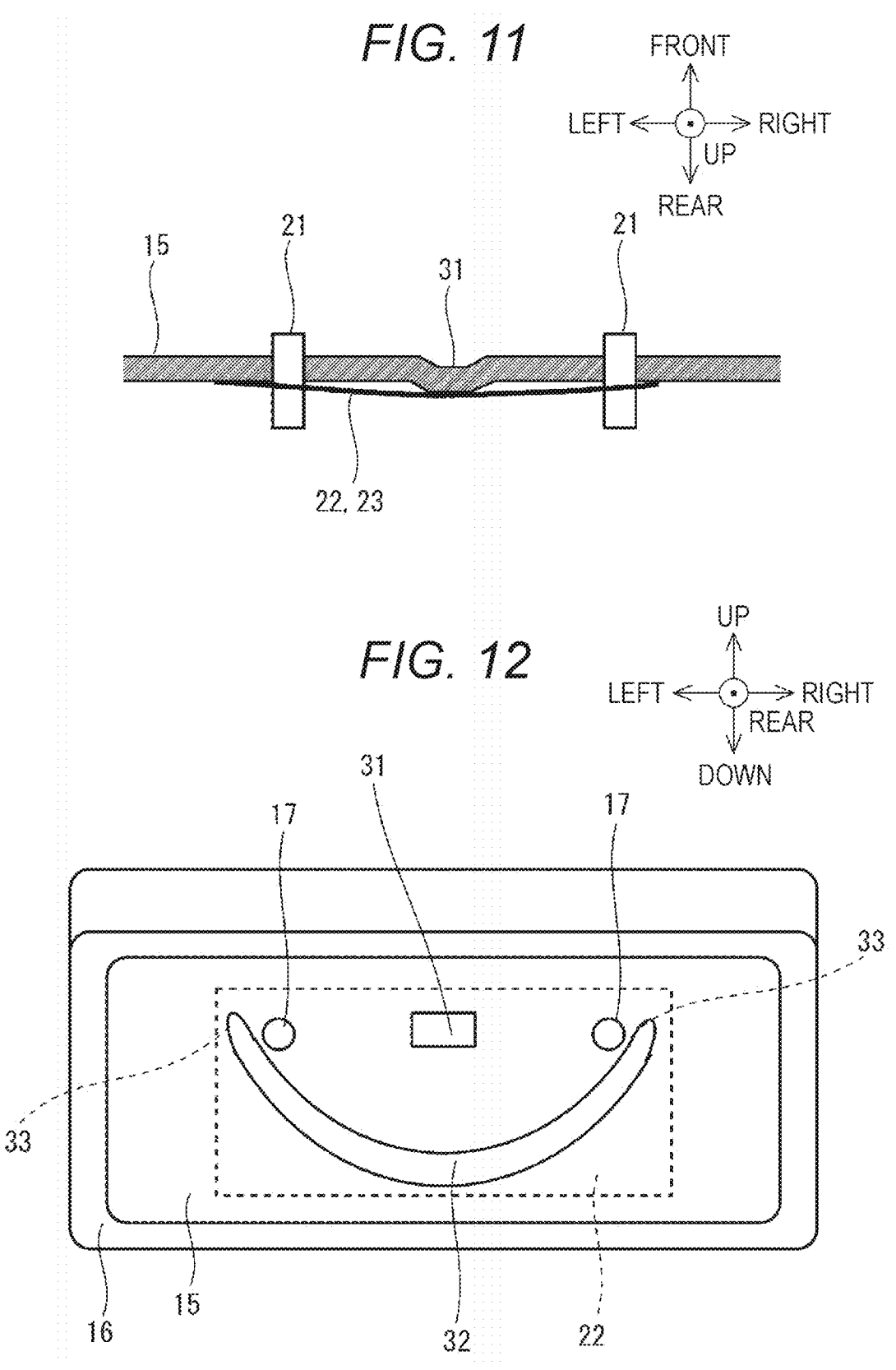
FIG. 11 is an exemplary schematic C-C cross-sectional view of the attachment surface and the license plate that has the flat plate shape, which are illustrated in FIG. 9.
FIG. 12 illustrates a modification of the attachment surface in FIG. 7.

FIG. 11 is an exemplary schematic C-C cross-sectional view of the attachment surface 15 and the license plate 22 that has the flat plate shape, which are illustrated in FIG. 9. The C-C cross section of FIG. 9 is a cross section of the attachment surface 15 at the height positions where the left and right support holes 17 are formed.

In FIG. 9, the license plate 22 employed in Japan is attached to the attachment surface 15. As indicated by a broken line in FIG. 9, the license plate 23 employed in various European countries often has a smaller up-down directional width and a larger left-right directional width than the license plate 22 employed in Japan. Then, these license plates 22 and 23 can be attached to the outer surface of the attachment surface 15 by means of the left and right support holes 17 in common. In this case, the attachment surface 15 desirably has a size having the left-right directional width wider than that of the license plate 23 employed in various European countries and the up-down directional width wider than that of the license plate 22 employed in Japan.

The attachment surface 15 illustrated in FIGS. 7 to 11 has a large size enough to allow attachment of the license plates 22 and 23 having different outer shapes.

Then, in the present embodiment, the first bead 31 formed at the center position between the left and right support holes 17 is formed in the attachment surface 15 so as to be within an area covered by both the license plate 23 employed in various European countries and the license plate 22 employed in Japan.

Additionally, the second bead 32 formed below the first bead 31 and having the arc shape is formed in the attachment surface 15 so as to be within the area covered by both the license plate 23 employed in various European countries and the license plate 22 employed in Japan.

As described above, the first bead 31 and the second bead 32 are formed in the attachment surface 15 so as to be within the area overlappingly covered by the license plates 22 and 23.

As described above, the first bead 31 and the second bead 32 are formed in the attachment surface 15 having the planar shape according to the present embodiment. The attachment surface 15 having the planar shape according to the present embodiment is less likely to be curved and vibrate as a whole as compared with that in FIG. 5.

Additionally, as illustrated in the longitudinal section of FIG. 10, the first bead 31 is formed so as to protrude rearward from the outer surface of the attachment surface 15 between the left and right support holes 17. Thus, the first bead 31 is in contact with the back surface (front surface) of the license plate 22 attached to the attachment surface 15 between the left and right support holes 17.

Then, the license plate 22 whose holes are fastened together with the left and right support holes 17 by using the fastening member 21 may be slightly curved as illustrated in FIG. 11. Note that, the degree of left-right directional curvature of the license plate 22 having the flat plate shape can be adjusted by a protrusion height (front-rear directional height) of the first bead 31 from the attachment surface 15. The license plate 22 having the flat plate shape can be not only supported by means of the left and right support holes 17 in a state of being attached to the attachment surface 15, but also supported in close contact with the first bead 31 between the left and right support holes 17. Since the license plate 22 having the flat plate shape is attached, in a slightly curved state, to the attachment surface 15, the license plate 22 is less likely to vibrate as a whole. The license plate 22 having the flat plate shape is less likely to vibrate as a whole as compared with the attached state in FIG. 6.

Additionally, the second bead 32 is covered by the license plate 22 attached to the attachment surface 15 and having the flat plate shape such that the second bead 32 is not visually recognized from the outside. A planar part alone of the attachment surface 15 is exposed around the license plate 22 attached to the attachment surface 15 and having the flat plate shape. The visually recognized state around the license plate 22 having the flat plate shape is similar to that in the case where the first bead 31 and the second bead 32 are not formed in the attachment surface 15.

As described above, since the first bead 31 is in contact with the back surface (front surface) of the license plate 22 having the flat plate shape, the license plate 22 is less likely to vibrate. The license plate 22 having the flat plate shape is firmly fixed by means of the left and right support holes 17 and the first bead 31 so as to be less likely to vibrate on the attachment surface 15 having the planar shape.

Additionally, the second bead 32 having the arc shape is formed in the attachment surface 15 having the planar shape so as to extend over the area covered by the license plate 22 having the flat plate shape.

Consequently, as illustrated in the longitudinal section of FIG. 10, even if the attachment surface 15 having the planar shape and the lower end of the license plate 22 attached to the attachment surface 15 and having the flat plate shape are close to each other, it can be expected that the attachment surface 15 and the lower end of the license plate 22 are much less likely to abut each other.

As described above, in the present embodiment, the attachment surface 15 allowing the attachment of the license plate 22 that is the display member of the automobile 1 and has the flat plate shape includes the first bead 31 and the second bead 32 together with the support holes 17 formed on at least the left and right sides. The first bead 31 is formed between the left and right support holes 17 of the attachment surface 15. Additionally, the second bead 32 is formed so as to extend at least over the width from the support hole 17 on the left side to the support hole 17 on the right side.

With this structure, in the present embodiment, it can be expected that the attachment surface 15 or the display member attached to the attachment surface 15 is less likely to vibrate, and noise that may be caused by vibrations of the attachment surface 15 or the display member is less likely to be generated. As a result, in the present embodiment, it can be expected to reduce the generation of noise from the rear gate 10.

Moreover, in the present embodiment, the first bead 31 is formed in the attachment surface 15 by extruding and deforming the attachment surface 15 of the outer panel 12 when the outer panel 12 is extruded by press working. Additionally, the second bead 32 is formed in the attachment surface 15 by extruding and deforming the attachment surface 15 of the outer panel 12 when the outer panel 12 is extruded by press working. As described above, in the present embodiment, the first bead 31 and the second bead 32 are formed in the attachment surface 15 by deforming the attachment surface 15 having the substantially planar shape itself formed in the outer panel 12 when the outer panel 12 is extruded by press working. For this reason, to reduce the vibrations of the attachment surface 15 or the display member attached to the attachment surface 15, for example, there is no need to perform a process in which a part of the inner panel 11 is extended to and coupled to the outer panel 12, or a process for interposing a stiffening member such as a reinforcement between the inner panel 11 and the outer panel 12. In the present embodiment, the first bead 31 and the second bead 32 can be formed in the attachment surface 15 simply by extruding the outer panel 12 by press working, and vibrations of the attachment surface 15 or the display member attached to the attachment surface 15 can be reduced. In the present embodiment, it can be expected that the generation of noise from the rear gate 10 is reduced by reducing the vibrations of the attachment surface 15 and the display member attached to the attachment surface 15 while avoiding complication of the structure of the rear gate 10 of the automobile 1.

Additionally, in the present embodiment, the first bead 31 is formed so as to protrude from the outer surface of the attachment surface 15 at a position between the left and right support holes 17.

Thus, in the present embodiment, the first bead 31 protruding from the outer surface of the attachment surface 15 can be in contact with the display member attached to the outer surface of the attachment surface 15 by means of the left and right support holes 17 at the position between the left and right support holes 17. The display member can be firmly supported so as not to rattle in the state of being attached to the outer surface of the attachment surface 15. When the display member is attached to the left and right support holes 17 in a state of being pressed by the first bead 31, the display member can be more firmly supported than when the display member is attached so as to be placed on the surface of the attachment surface 15. It can be expected to effectively reduce the generation of the noise such as the rattling noise due to the rattle of the display member.

Additionally, since the second bead 32 formed so as to extend over the width from the support hole 17 on the left side to the support hole 17 on the right side is provided together with the first bead 31, even if the first bead 31 is in contact with the display member between the left and right support holes 17, the attachment surface 15 can maintain its original substantially planar shape.

Additionally, in the present embodiment, the second bead 32 is formed in the attachment surface 15 so as to have the arc shape without a corner such that the second bead 32 is adjacent to the left and right support holes 17 in the up-down direction of the automobile 1. The two ends 33 of the arc shape of the second bead 32 are respectively positioned on the left and right outer sides of the left and right support holes 17 in the attachment surface 15. The two ends 33 of the arc shape of the second bead 32 are respectively positioned on the left and right outer sides of the left and right support holes 17 in the range of the up-down directional width W of the left and right support holes 17.

Consequently, in the present embodiment, the second bead 32 can reduce not only the vibrations of the whole of the attachment surface 15 along the left-right directional axis of the automobile 1 but also the vibrations of the whole of the attachment surface 15 along the axis in another direction, for example, the up-down directional axis of the automobile 1. It can be expected to effectively reduce the generation of muffled noise due to the vibrations of the attachment surface 15. Even if the rear gate 10 has a structure in which the inner panel 11 formed by press working and the outer panel 12 formed by press working are superimposed with each other and noise can be amplified in the internal space of the rear gate 10, it can be expected to effectively reduce the generation of noise such as muffled noise from the rear gate 10 due to the vibrations of the attachment surface 15.

On the other hand, for example, if the second bead 32 simply has, for example, a left-right directional straight line shape or a V shape, the attachment surface 15 may vibrate along the up-down directional axis of the automobile 1 or vibrate so as to be bent with a bent part of the V shape as a base point. In this case, noise such as muffled noise from the rear gate 10 may be generated because of vibrations different from those generated in the case where the second bead 32 is not provided.

For example, in the present embodiment, the two ends 33 of the arc shape of the second bead 32 are respectively positioned on the left and right outer sides of the left and right support holes 17. Consequently, the left and right support holes 17 and the second bead 32 are not spaced apart from each other in the up-down direction of the automobile 1. The attachment surface 15 is less likely to be deformed so as to be bent between the left and right support holes 17 and the second bead 32 formed so as to be adjacent to the left and right support holes 17 in the up-down direction. The vibrations of the attachment surface 15 can be more effectively reduced. The generation of noise such as muffled noise from the rear gate 10 can also be more effectively reduced.

Additionally, in the present embodiment, the attachment surface 15 is formed in the outer panel 12 by extruding the outer panel 12 by press working.

In this case, the attachment surface 15 of the outer panel 12 can have, around its periphery, the frame 16 extruded into the curved shape by press working. The attachment surface 15 is formed in the outer panel 12 so as to be a surface recessed forward of the automobile 1 with respect to the remaining part of the outer panel 12 other than the attachment surface 15. The attachment surface 15 may serve to stiffen the outer panel 12. The outer panel 12 is less likely to vibrate as a whole.

Moreover, in the present embodiment, the vibrations of the attachment surface 15 having such a highly independent surface structure can be reduced by means of the first bead 31 and the second bead 32.

As a result, in the present embodiment, it can be expected to effectively reduce the noise heard by the occupant due to the vibrations of the outer panel 12.

Additionally, in the present embodiment, the attachment surface 15 has a size enough to allow attachment of the license plates 22 and 23 having different outer shapes. The first bead 31 is formed in the attachment surface 15 so as to be within the area overlappingly covered by the license plates 22 and 23. Additionally, the second bead 32 is formed in the attachment surface 15 so as to be within the area overlappingly covered by the license plates 22 and 23.

As described above, the first bead 31 and the second bead 32 are formed in the attachment surface 15 so as to be within the area overlappingly covered by the license plates 22 and 23. The first bead 31 or the second bead 32 is less likely to be partially exposed around the license plate 22 and 23 attached to the attachment surface 15. The license plates 22 and 23 employed in various countries can be attached to the attachment surface 15 in a state of being adapted to the attachment standards of the various countries.

The above embodiment is an example of the preferred embodiment of the disclosure, but the disclosure is not limited thereto, and various modifications or changes may be made without departing from the gist of the disclosure.

FIG. 12 illustrates a modification of the attachment surface 15 in FIG. 7. The attachment surface 15 in FIG. 12 is viewed from the rear of the automobile 1 in FIG. 1.

In FIG. 12, the second bead 32 having the arc shape is formed to be longer in the up-down direction than that in the case illustrated in FIG. 7 or 9.

The license plate 22 employed in Japan is attached to the attachment surface 15 in FIG. 12.

Even in this case, the second bead 32 formed in the attachment surface 15 is covered together with the first bead 31 so as not to be visually recognized from the outside by the license plate 22 employed in Japan. The planar part alone of the attachment surface 15 is exposed around the license plate 22 attached to the attachment surface 15 and employed in Japan. The visually recognized state around the license plate 22 having the flat plate shape is similar to that in the case where the first bead 31 and the second bead 32 are not formed in the attachment surface 15.

In the above-described embodiment, one first bead 31 is formed in the attachment surface 15 having the planar shape.

In addition to this, for example, first beads 31 may be formed in the attachment surface 15 having the planar shape. For example, the first beads 31 may be provided side by side between the left and right support holes 17.

Additionally, in the above-described embodiment, the first bead 31 is formed so as to protrude rearward from the attachment surface 15.

In addition to this, for example, the first bead 31 may be formed so as to protrude forward from the attachment surface 15.

The first beads 31 may include a combination of one formed so as to protrude rearward from the attachment surface 15 and one formed so as to protrude forward from the attachment surface 15.

In the above-described embodiment, one second bead 32 having the arc shape is formed in the attachment surface 15 having the planar shape.

In addition to this, for example, second beads 32 may be formed in the attachment surface 15 having the planar shape. For example, the second beads 32 may be provided separately above and below the left and right support holes 17.

Additionally, in the above-described embodiment, the second bead 32 is formed so as to protrude forward from the attachment surface 15.

In addition to this, for example, the second bead 32 may be formed so as to protrude rearward from the attachment surface 15.

The second beads 32 may include a combination of one formed so as to protrude rearward from the attachment surface 15 and one formed so as to protrude forward from the attachment surface 15.

In the above-described embodiment, the first bead 31 and the second bead 32 are formed in the attachment surface 15 in order to stiffen the attachment surface 15 having the planar shape.

Consequently, the attachment surface 15 having the planar shape can be basically stiffened, but in some cases further stiffening structures may be combined.

For example, in addition to the formation of the first bead 31 or the second bead 32 in the attachment surface 15 itself, furthermore, a part of the inner panel 11 may be extended to and coupled to the outer panel 12.

In addition to this, for example, in addition to the formation of the first bead 31 or the second bead 32 in the attachment surface 15 itself, furthermore, a reinforcement may be interposed between the inner panel 11 and the outer panel 12.

The invention claimed is:

1. A rear gate for a vehicle, the rear gate comprising an inner panel and an outer panel superimposed on the inner panel, the rear gate being provided so as to be openable and closable with respect to a rear opening of the vehicle, the rear gate comprising:

an attachment surface provided in the outer panel, the attachment surface allowing attachment of a display member of the vehicle;

supports provided on at least left and right sides of the attachment surface, the supports allowing the display member to be supported on the attachment surface;

a first bead provided on the attachment surface, the first bead being provided between the supports on the left and right sides, the first bead protruding rearward from the attachment surface, a rearmost end of the first bead being located rearward of a rearmost end of the supports on the left and right sides; and a second bead provided on the attachment surface, the second bead extending at least over a width of the attachment surface from one of the supports on the left side to one of the supports on the right side, wherein the second bead is formed in an arc shape such that the second bead is adjacent to the supports on the left and right sides in an up-down direction of the vehicle, wherein the arc shape of the second bead has two ends respectively positioned on left and right outer sides of the supports on the left and right sides of the attachment surface, and wherein a central portion of the arc shape is located below both ends of the arc shape of the second bead.

2. The rear gate according to claim 1, wherein the first bead is formed by deforming the attachment surface of the outer panel so as to protrude from an outer surface of the attachment surface between the supports on the left and right sides.

3. The rear gate according to claim 1, wherein the second bead is formed by deforming the attachment surface of the outer panel into the arc shape such that the second bead is adjacent to the supports on the left and right sides in the up-down direction of the vehicle, and the arc shape of the second bead has two ends respectively positioned on the left and right outer sides of the supports on the left and right sides of the attachment surface.

4. The rear gate according to claim 2, wherein the second bead is formed by deforming the attachment surface of the outer panel into the arc shape such that the second bead is adjacent to the supports on the left and right sides in the up-down direction of the vehicle, and the arc shape of the second bead has two ends respectively positioned on left and right outer sides of the supports on the left and right sides of the attachment surface.

5. The rear gate according to claim 3, wherein the attachment surface is provided on the outer panel by deforming the outer panel.

6. The rear gate according to claim 4, wherein the attachment surface is provided on the outer panel by deforming the outer panel.

7. The rear gate according to claim 5, wherein the display member is a license plate of the vehicle, the attachment surface has a size large enough to allow attachment of license plates having different outer shapes, and the second bead is formed in the attachment surface so as to be within an area overlappingly covered by the license plates.

8. The rear gate according to claim 6, wherein
the display member is a license plate of the vehicle,
the attachment surface has a size large enough to allow
attachment of license plates having different outer
shapes, and
the second bead is formed in the attachment surface so as
to be within an area overlappingly covered by the
license plates.

9. The rear gate according to claim 1, wherein
both ends of the arc shape of the second bead are located
above lowermost ends of the supports on the left and
right sides.

10. The rear gate according to claim 9, wherein
wherein the second bead protrudes forward from an inner
surface of the attachment surface.

11. The rear gate according to claim 10, wherein
the first bead is in contact with a back surface of the
display member supported by the supports on the left
and right sides, and
wherein the second bead does not contact the display
member supported by the supports on the left and right
sides.

12. The rear gate according to claim 11, wherein
the first bead and the second bead are formed by deform-
ing the attachment surface of the outer panel.

13. A rear gate for a vehicle, the rear gate comprising:
an attachment surface facing rearward of the vehicle, the
attachment surface allowing attachment of a display
member of the vehicle;
supports provided on at least left and right sides of the
attachment surface, the supports allowing the display
member to be supported on the attachment surface;
a first bead provided on the attachment surface, the first
bead being provided between the supports on the left
and right sides, the first bead protruding rearward from the attachment surface, a rearmost end of the first bead
being located rearward of a rearmost end of the sup-
ports on the left and right sides; and
a second bead provided on the attachment surface, the
second bead extending at least over a width of the
attachment surface from one of the supports on the left
side to one of the supports on the right side,
wherein the second bead is formed in an arc shape such
that the second bead is adjacent to the supports on the
left and right sides in an up-down direction of the
vehicle,
wherein the arc shape of the second bead has two ends
respectively positioned on left and right outer sides of
the supports on the left and right sides of the attachment
surface, and
wherein a central portion of the arc shape is located below
both ends of the arc shape of the second bead.

14. The rear gate according to claim 13, wherein
both ends of the arc shape of the second bead are located
above lowermost ends of the supports on the left and
right sides.

15. The rear gate according to claim 14, wherein
wherein the second bead protrudes forward from an inner
surface of the attachment surface.

16. The rear gate according to claim 15, wherein
the first bead is in contact with a back surface of the
display member supported by the supports on the left
and right sides, and
wherein the second bead does not contact the display
member supported by the supports on the left and right
sides.

17. The rear gate according to claim 16, wherein
the first bead and the second bead are formed by deform-
ing the attachment surface.

* * * * *